United States Patent [19]

Sigg

[11] 4,274,523
[45] Jun. 23, 1981

[54] AUTOMATICALLY ENGAGEABLE JAW CLUTCH

[75] Inventor: Hans Sigg, Mutschellen, Switzerland

[73] Assignee: Maag Gear-Wheel & Machine Co. Ltd., Zurich, Switzerland

[21] Appl. No.: 956,040

[22] Filed: Oct. 30, 1978

[30] Foreign Application Priority Data

Nov. 10, 1977 [CH] Switzerland ............ 13705/77

[51] Int. Cl.³ .............. F16D 11/10; F16D 23/02
[52] U.S. Cl. ................................. 192/21; 74/377; 192/48.9; 192/51; 192/67 A
[58] Field of Search ........... 192/21, 51, 67 A, 48.9; 74/377

[56] References Cited

U.S. PATENT DOCUMENTS

| 834,394 | 10/1906 | Metcalf | 192/21 |
|---|---|---|---|
| 3,154,181 | 10/1964 | Sigg | 192/67 A |
| 3,888,337 | 6/1975 | Worthen | 192/21 X |
| 3,960,253 | 6/1976 | Sigg | 192/67 A |
| 4,053,038 | 10/1977 | Herrick | 192/67 A |

Primary Examiner—Rodney H. Bonck
Attorney, Agent, or Firm—Werner W. Kleeman

[57] ABSTRACT

An automatically engageable jaw clutch having a toothed drive hub, a toothed power take-off hub, and a clutch star axially displaceable with respect to the power take-off hub. The clutch star is continuously connected with the drive hub for conjoint rotation by means of first teeth means formed thereat and has second teeth means which can be brought into engagement with the teeth of the power take-off shaft by axial shifting of the clutch star. A screw socket or sleeve which is connected by means of a pair of coarse-pitch threading with the power take-off hub, is only conjointly axially displaceable together with the clutch star and rotatable relative thereto. The screw socket is entrainable by the clutch star by means of a pawl blocking mechanism composed of a pawl and ratchet teeth, when the drive hub overrides the power take-off hub. A switching device serves for selectively rendering ineffectual the pawls and contains a sleeve which is axially adjustable in relation to the clutch star and equipped with a ramp surface which, in a predetermined axial position of the sleeve in relation to the clutch star, hinders the pawls from engaging with the ratchet teeth.

5 Claims, 5 Drawing Figures

AUTOMATICALLY ENGAGEABLE JAW CLUTCH

BACKGROUND OF THE INVENTION

The present invention relates to a new and improved construction of automatically engageable jaw clutch.

The automatically engageable jaw clutch of the invention is of the type comprising a toothed drive hub, a toothed power take-off hub, and a clutch or coupling star axially displaceable with respect to the power take-off hub. This clutch star can be continuously connected with the drive hub for conjoint rotation by means of first teeth means formed thereat and has second teeth means which can be brought into engagement with the teeth of the power take-off hub by axially shifting the clutch star. Further, there is provided a screw socket or sleeve which is connected by a pair of coarse-pitch threading with the power take-off hub, only can be conjointly axially shifted or displaced with the clutch star but is however rotatable relative thereto and can be entrained by means of the clutch star by a pawl blocking device composed of a pawl and ratchet teeth when the drive hub overrides or overtakes the power take-off hub.

With a heretofore known jaw clutch or gear coupling of this type, as disclosed in Swiss Pat. No. 499,735, the teeth of the drive hub comprise straight teeth which are formed at the inside of a pot-shaped projection of the drive hub and continuously mesh with straight teeth formed at the outside of the clutch of coupling star. The power take-off hub is likewise pot-shaped in construction and possesses at its inside coarse-pitch threading which continuously engages with outer coarse-pitch threading of the screw socket or sleeve. The screw socket is axially displaceably guided upon a tubular-shaped projection of the power take-off hub and together with such delimits a cylindrical chamber or space. In the cylindrical chamber there prevails an oil pressure which strives to push the screw socket and together therewith the clutch or coupling star away from the power take-off hub. At the outside of the screw socket there is furthermore formed a pawl gear-tooth system or ratchet teeth operatively associated with pawls mounted at the inside of the clutch start. At the outside of each pawl there is arranged a pivot or tilt edge in such a manner that the centrifugal forces acting upon the pawls, during rotation of the clutch star, strive to bring the pawls into engagement with the pawl gear-tooth system or ratchet teeth. At the inside of the clutch star there are additionally formed helical teeth which come into engagement with helical teeth formed at the outside of the clutch hub when the clutch star is driven by the drive hub at such rotational speed that it strives to overtake or override the power take-off hub, whereby it entrains by means of the pawls the screw socket in the direction of rotation. Consequently, the screw socket is threaded into the power take-off hub, and, in turn, entrains the clutch star in axial direction with respect to the power take-off hub, whereby it overcomes the oil pressure prevailing in the aforementioned cylindrical chamber and displaces the oil contained therein, against the prevailing centrifugal force, into a further radial inwardly situated space or chamber. The same oil pressure ensures that the screw socket again will be screwed out of the power take-off hub, and thus, disconnects the clutch star from the power take-off hub as sooon as the rotational speed of the drive hub drops below that of the power take-off hub.

According to another known type of jaw clutch or gear coupling of the previously mentioned species, as disclosed in Swiss Pat. No. 390,007, the teeth of the drive hub and the power take-off hub are both straight external teeth and the clutch or coupling star accordingly possesses two straight inner teeth systems. Also in the clutch star there are mounted pawls which coact with a pawl gear-tooth system or ratchet teeth formed at the outside of the screw socket. The screw socket is provided at its inside with coarse-pitch threading which is engageable with coarse-pitch threading at the outside of a sleeve which is rigidly connected for rotation with the power take-off hub, but however axially displaceable in relation thereto. Radially within this sleeve there is arranged a piston rod of an hydraulic piston-and-cylinder unit which is connected with the clutch or coupling star. If, with this clutch, the clutch star overtakes the power take-off hub, and thus, entrains by means of the pawls the screw socket, so that such is threaded towards the power take-off hub, then there is only initiated the meshing engagement of the straight teeth of the clutch star and the power take-off shaft, and the clutch star entrains the piston rod of the piston-and-cylinder unit to such an extent until a control opening formed thereat communicates one side or face of the related piston with a pressure oil line or conduit. From this moment on the engagement of the jaw clutch is augmented by the oil pressure effective at the piston. In order to disengage the jaw clutch it is necessary to allow the oil pressure to be effective at the other side or face of the piston by actuating a valve.

With both of the heretofore known jaw clutches or gear couplings the coacting teeth of the clutch star and the power take-off hub are configured such that during complete engagement of these teeth the screw socket rotates forwardly through a small angle in relation to the clutch star so that the rotational moment transmitted by the drive hub to the power take-off hub does not load the pawls. The pawls are also, in the disengaged state of the aforementioned jaw clutches, completely relieved of load as long as the drive hub rotates slower than the power take-off hub. However, the pawls in the disengaged position always remain effective in a manner such that they only permit a forward rotation of the screw socket in relation to the clutch star. Each rearward rotatiion of the screw pocket in relation to the clutch start, on the other hand, has the unavoidable consequence that the pawls initiate the engagement operation in the described manner. Therefore, it is not possible to rearwardly rotate the power take-off hub in relation to the drive hub.

In the meantime it has been found that it is desired, in certain instances, to render possible a reverse rotation of the power take-off hub in relation to the drive hub. This, for instance, is the case with marine reversing gearing of the type described in my commonly assigned copending United States application Ser. No. 919,045 filed June 26, 1978 entitled "Marine Reversing Gearing" to which reference may be readily had and the disclosure of which is incorporated herein by reference. The marine reversing gearing of such application has a drive unit which selectively directly forwardly drives by means of a first clutch a pinion or rearwardly drives the pinion by means of reversing gearing and a second clutch.

SUMMARY OF THE INVENTION

It is a primary object of the present invention to provide a new and improved construction of automatically engageable jaw clutch or gear coupling which is not associated with the aforementioned drawbacks and limitations of the prior art construction.

Another and more specific object of the present invention aims at further constructing an automatically engageable jaw clutch of the previously mentioned type in such a manner that there can be accomplished a reverse rotation of the power take-off hub in relation to the drive hub.

According to the invention a switching device is provided, by means of which it is possible to optionally or selectively render ineffectual the pawls.

Due to this structure there is achieved the beneficial result that with disengaged clutch it is possible to select between two positions, namely a preparatory position where in known manner the clutch is prepared by means of its pawls to determine whether the drive hub is running in synchronism with the power take-off hub and, if this is the case, to interconnect rigidly for rotation with one another both of the hubs, and a rest position in which the clutch affords freedom for the power take-off hub to rotate forwardly or backwardly, with random rotational speed, independently of the drive hub.

The invention has particular importance, especially for marine reversing gearing according to the aforementioned U.S. patent application Ser. No. 919,045 filed June 26, 1978, but also for other reversing gearing, when the jaw clutch of the invention is coaxially arranged with a second jaw clutch which is symmetrical thereto and with which it is connected such that the drive hubs of both clutches are connected with a common drive shaft, namely the one drive hub fixedly at the drive shaft and the other drive hub is connected with such common drive shaft by means of a reversing gearing stage. Further, the power take-off hubs are fixedly connected with one another by means of the power take-off shaft which is mounted to be axially non-displaceable. The switching devices of both clutches are commonly actuated and, related to the associated pawls, actuatable in opposite sense.

The switching device can comprise electromagnetic, pneumatic or hydraulic actuation elements, by means of which it is possible to render ineffectual the pawls, i.e., to hinder such from engaging with the pawl gear-tooth system or ratchet teeth. Particularly simple and robust is a switching device having a sleeve which can be axially displaced in relation to the clutch or coupling star and having an inclined or ramp surface which, in a certain axial position of the sleeve in relation to the clutch star, hinders the pawls from engaging with the pawl gear-tooth system or ratchet teeth.

The last-mentioned design of the switching device is particularly suitable for a jaw clutch where, as with the described heretofore known jaw clutches, the pawl gear-tooth system or ratchet teeth are arranged radially within the clutch star at the screw socket and the pawls are mounted at the clutch star and each provided with a respective counter arm. According to the invention each pawl has operatively associated therewith a bolt which is guided to be radially displaceable in the clutch star, the radial outer end of which bolt, protruding from the clutch star, coacts with the ramp surface of the sleeve and its radial inner end coacts with the counter arm of the related pawl.

The sleeve can be designed such that it only fulfills its purpose as an element of the switching device. In this case the clutch star, as with the described heretofore known jaw clutches, can be in direct engagement by means of its first teeth means with the teeth of the drive hub. The inventive sleeve can also serve, however, as an intermediate element for transmitting a rotational moment between the drive hub and the coupling or clutch star when it has two straight teeth or gear-teeth systems, of which the first continuously meshes with the teeth of the drive hub and the second continuously meshes with the first teeth means of the clutch star. This construction of the inventive clutch is particularly suitable for compensating axle alignment errors of the power take-off hub in relation to the drive hub since the sleeve forms together with the drive hub on the one hand and the coupling or clutch star on the other hand a double tooth link arrangement, whose linkage action is not impaired if the related teeth of the clutch star and the power take-off hub are designed as helical teeth and are fixedly threaded into one another in the completely engaged state of the clutch.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
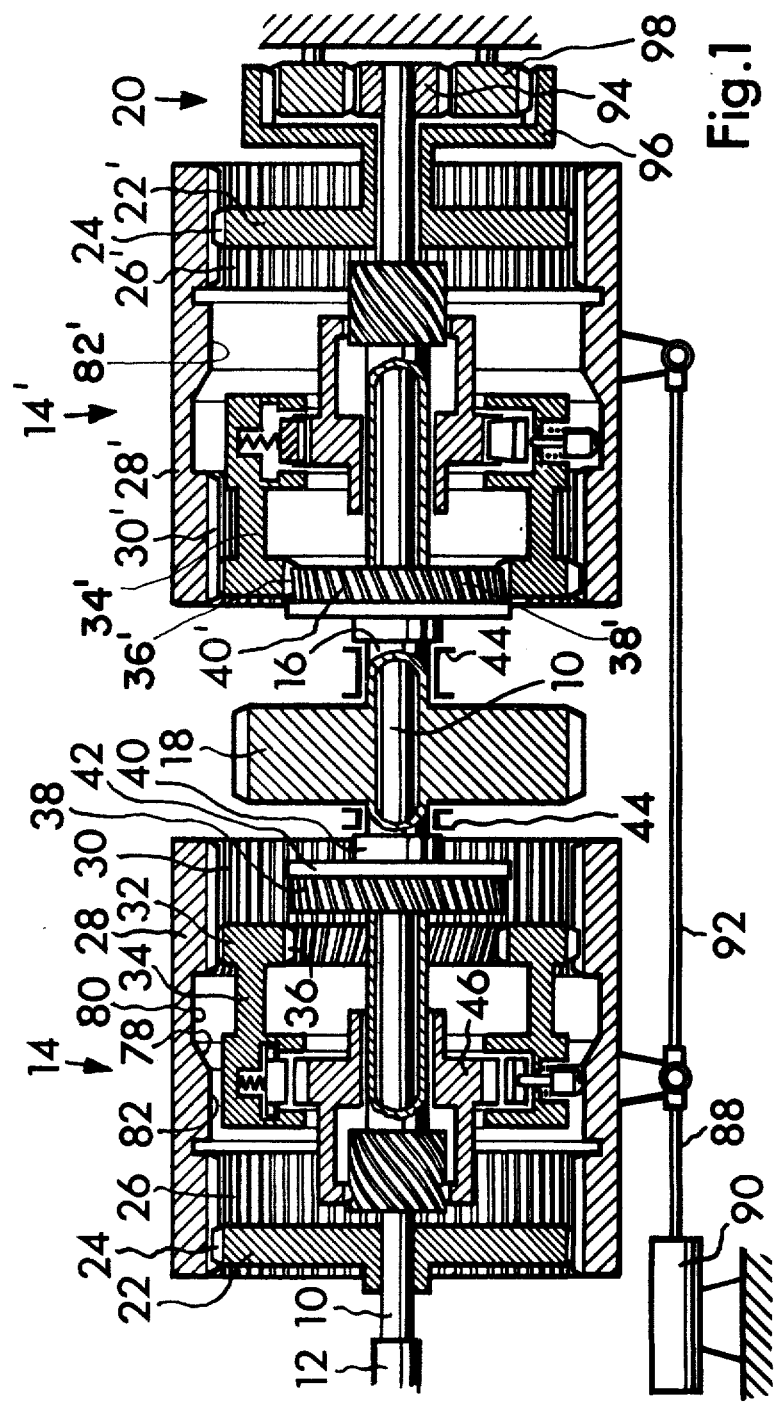
FIG. 1 is an axial sectional view through two coaxial tandemly arranged mutually symmetrical jaw clutches or gear couplings, of which the right-hand illustrated clutch is engaged whereas the left-hand illustrated clutch is disengaged and retained in its rest position.
Figure 2:
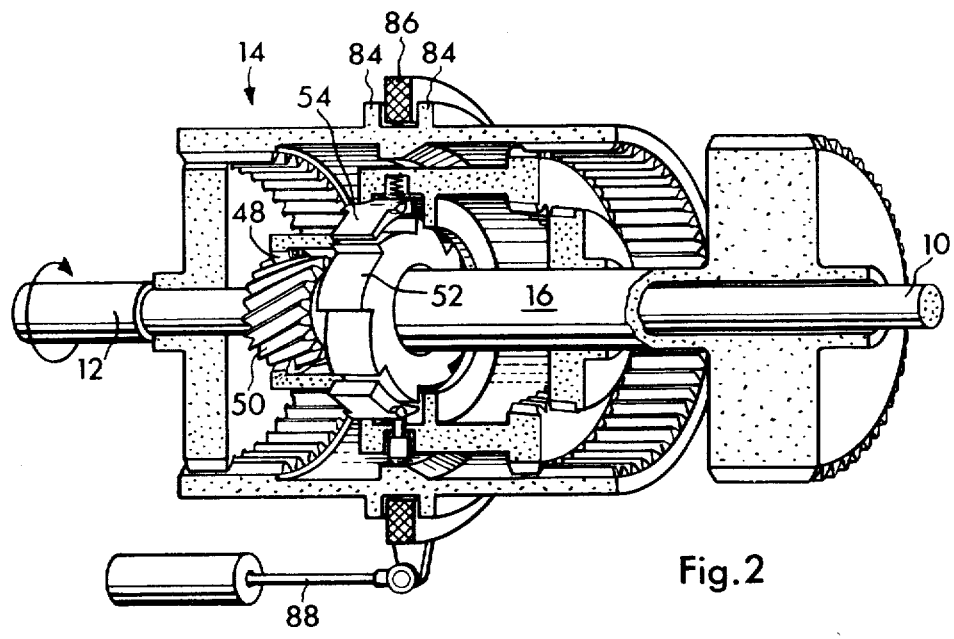
FIG. 2 is a perspective view of the left-hand illustrated jaw clutch, in sectional view, shown in the same manner as in FIG. 1, and likewise illustrated in its rest position.
Figure 3:
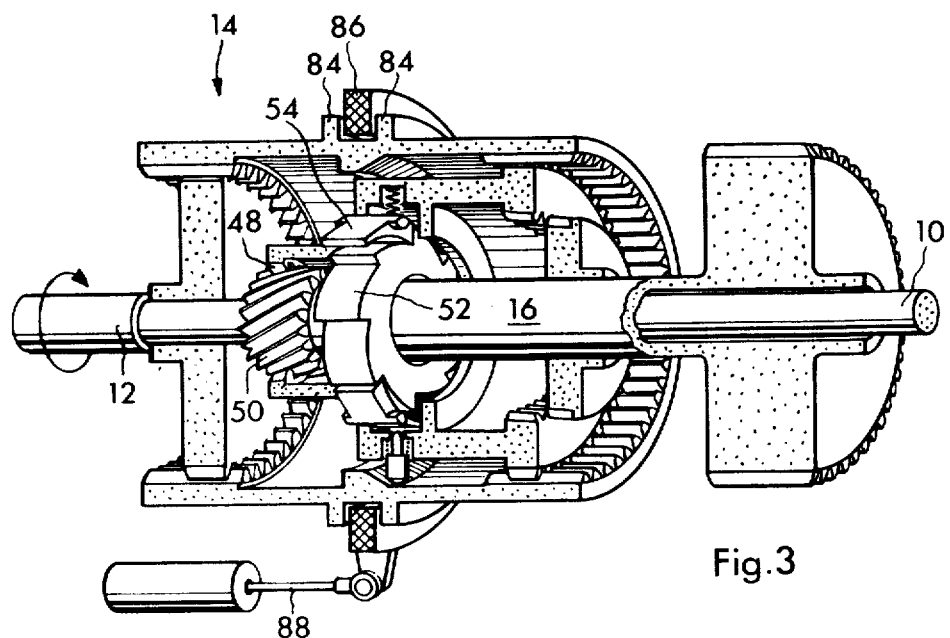
FIG. 3 is a perspective view of the left-hand illustrated jaw clutch, corresponding to the showing of FIG. 2, however shown still disengaged but assuming its preparatory position.
Figure 4:
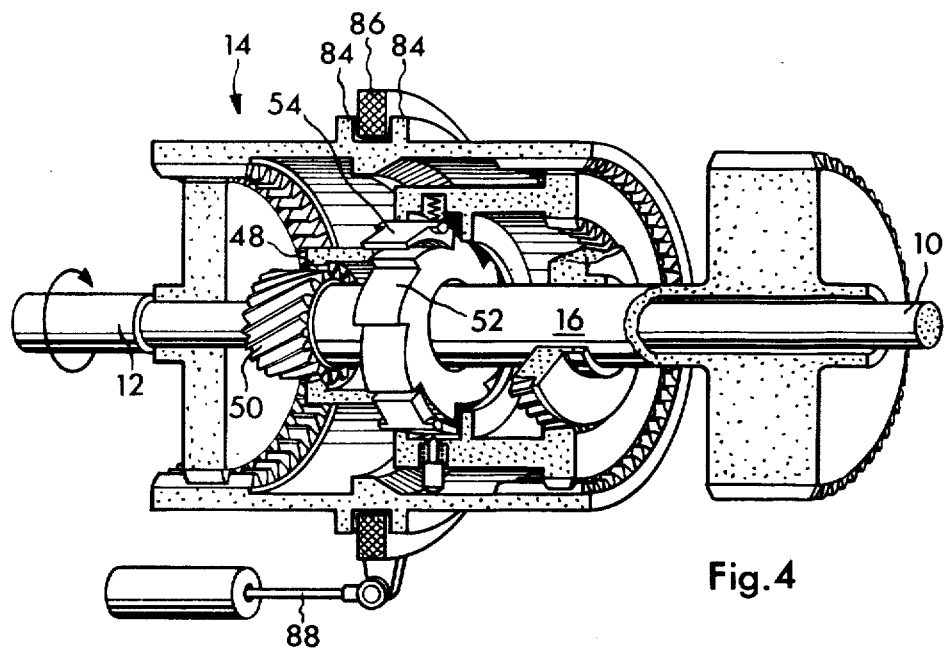
FIG. 4 is a corresponding perspective view of the left-hand illustrated jaw clutch in its engaged or clutched state.

Describing now the drawings, according to the showing of FIG. 1 a drive shaft 10, driven by any suitable drive unit or drive 12 in the direction of the arrow shown in FIGS. 2 to 4, extends through two jaw clutches or gear couplings 14 and 14' and a hollow power take-off shaft 16 having secured thereon a power take-off pinion 18 to reversing gearing 20.

The function of the jaw clutches 14 and 14' is to selectively couple the drive shaft 10 directly or by means of the reversing gearing 20 with the power take-off shaft 16, so that the drive unit 12 with unchanged direction of rotation, can selectively drive the power take-off pinion 18 forwardly or rearwardly. Both of the jaw clutches 14 and 14' are of essentially identical construction, however constructed to be mirror-image symmetrical. Their components are designated hereinafter with the same reference characters, except that those of the right-hand illustrated jaw clutch 14' have applied to the identical reference characters a prime marking and shall only be discussed in particular detail whenever the context of the disclosure so requires.

The jaw clutch 14 comprises a drive hub 22 which is attached to the drive shaft 10 and has an outer straight gear-tooth system or straight teeth 24. The straight gear-tooth system 24 is in continuous engagement with a complementary straight gear-tooth system or straight teeth 26 formed at the inside of one end of an axially displaceable sleeve 28 and approximately three times as wide as the straight gear teeth 24. The sleeve or sleeve member 28 possesses at its other end, at the inside thereof, a second straight gear-tooth system or straight gear teeth 30 which are continuously in meshing engagement with a complementary first gear-tooth system 32 or teeth means at the outside of a coupling or clutch star 34 which is rotatably mounted upon the power take-off shaft 16. The mounting bearings for the clutch star have been conveniently omitted from the drawings to simplify the illustration. The clutch star 34 possesses at its inside a second gear-tooth system or teeth 36 which can be brought into engagement, by axial displacement of the clutch star 34, with a complementary gear-tooth system or teeth 38 at a power take-off hub 40. The gear-tooth systems or teeth 36 and 38, in the illustrated embodiment constitute, helical teeth. The helical motion, i.e., the thread-in motion, by means of which they can be brought into meshing engagement with one another, is limited by an annular or ring-shaped stop or impact member 42 which is formed at the power take-off hub 40. This power take-off hub 40 is attached to the power take-off shaft 16 and fixedly held in axial direction by means of bearings 44 in which such is mounted.

Within the coupling or clutch star 34 there is mounted upon the hollow power take-off shaft 16 a screw socket or sleeve 46 in such a fashion that it can rotate in relation to the power take-off shaft 16 as well as in relation to the clutch star 34, however, only is axially displaceable in conjunction with the clutch star 34 in relation to the power take-off shaft 16. The screw socket 46 is provided at its inside with a coarse-pitch threading 48 which is continuously threadably engaged with coarse-pitch threading 50 at the power take-off shaft 16. The pitch of the coarse-pitch threading or thread means 48 and 50 corresponds in direction with the pitch of the helical teeth 36 and 38, but however is smaller in magnitude, i.e., the lead angle of the coarse-pitch threading 48 and 50, which also can be referred to as helical teeth, is greater than the lead angle of the teeth 36 and 38. Thus, the lead angle of the coarse-pitch threading 48 and 50 can amount to, for instance, 40° and the lead angle of the teeth 36 and 38, related to the same reference diameter, can amount to 25°. The teeth 36 and 38 are preferably provided at their ends which initially come into engagement with one another during the clutching action with a pre-bevel, the lead angle of which, calculated upon the basis of the diameter of the coarse-pitch threading 48 and 50, likewise amounts to 40°.

Figure 5:
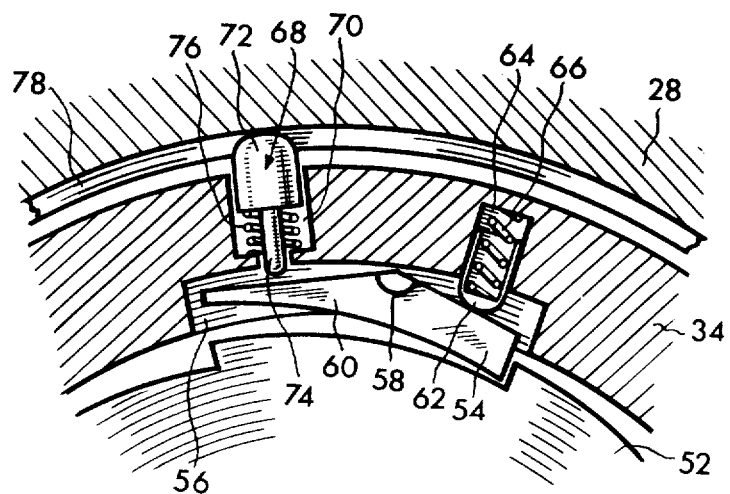
FIG. 5 is a markedly enlarged partial sectional view of part of the arrangement of clutch shown at the left-hand side of FIG. 1.

At the outside of the screw socket 46 there is formed a pawl tooth system or ratchet 52 with which there is operatively associated a set of pawls 54. The pawls 54, as particularly well seen by referring to FIG. 5, are mounted in a respective radially inwardly open recess 56 of the clutch star 34 and each have a tilt or pivot edge 58 at which merges a counter arm 60. Each pawl 54 has operatively associated therewith a bushing 62 which is displaceably guided in a radial bore 64 in the clutch star 34 and can be pre-biased by a compression or pressure spring 66 in such a manner that it strives to retain the related pawl 54 in the position shown in FIG. 5 where it is ready to engage behind a tooth of the pawl gear-tooth system or ratchet 52.

Operatively associated with the counter arm 60 of each pawl 54 is a bolt 68 which is displaceably guided within a radial stepped bore 70 in the coupling or clutch star 34 and has a thick radial outer section or portion 72 and a slim radial inner section or portion 74. Each bolt 68 is radially outwardly pre-biased by means of a compression or pressure spring 76 arranged in its related stepped bore 70 and which presses against its radial outer section or portion 72, so that its radial outer end continuously bears against the inner wall of the sleeve 28.

At the inner wall of the sleeve 28 there is formed a ramp or inclined surface 78 which, in turn, is limited by a radial outer cylindrical surface 80, and, on the other hand, by a radial inner cylindrical surface 82. The sleeve 28 can be displaced out of the rest position shown in FIGS. 1 and 2, where the bolts 68 bear at the radial inner cylindrical surface 82, into the preparatory position according to FIGS. 3 and 5 where the bolts 68 bear at the radial outer cylinder surface 80. In order to render possible this displacement during operation, the sleeve 28 is provided at its outer side with two ring-shaped ribs 84 between which there is mounted a sliding or slip ring 86. The sliding ring 86 is connected with the piston rod 88 of an hydraulic or pneumatic piston-and-cylinder unit 90. The sleeves 28 and 28' of both jaw clutches 14 and 14', as shown in FIG. 1, are interconnected with one another by a connection rod 92 arranged as an extension of the piston rod 88 in such a fashion that during each actuation of the piston-and-cylinder unit 90 they carry out movements of the same magnitude in the same direction. Such movements of the sleeves 28 and 28' in the same direction as viewed from the outside are, in fact, opposite movements in relation to the components or elements arranged internally of each of both sleeves 28 and 28' owing to the mirror-symmetrical configuration of both jaw clutches 14 and 14'.

The reversing gearing 20, in the illustrated embodiment, comprises an internal central gear 94 attached to the drive shaft 10, an external central gear 96 arranged coaxially with respect to the internal central gear 94, and a set of stationarily mounted intermediate gears 98, each of which meshes with both central gears 94 and 96. The outer or external central gear 96 is fixedly connected with the drive hub 22' of the jaw clutch 14'.

With the switching state illustrated in FIG. 1—the left jaw clutch 14 assumes its rest position and is therefore ineffectual, whereas the right jaw clutch 14' is engaged—the rotational moment of the drive unit 12 is transmitted to the power take-off shaft 16 by means of the drive shaft 12 and the reversing gearing 20, the drive hub 22', the sleeve 28', the clutch star 34' and the power take-off hub 40'. The power take-off shaft 16 rotates opposite to the direction of rotation of the drive unit 12, in other words rearwardly, if the rotational direction of the drive unit is designated as the forward direction, and this rearward rotation is accomplished owing to the incorporation of the reversing gearing 20.

If the power take-off pinion 18 drives, for instance by means of a step-down gearing, a ship's propeller, then such rotates in the reverse direction.

Now if a reversal to forward travel is to be accomplished, then the drive unit 12 is brought to standstill and the power take-off shaft 16 can be stopped by means of a not particularly illustrated brake which can be part of the ship's gearing and driven by such gearing. Thereafter, the piston-and-cylinder unit 90 is actuated in such a manner that both of the sleeves 28 and 28' are shifted towards the left. Consequently, the bolts 68 are exposed to the force of their compression springs 76 and move radially outwardly. As a result, the compression springs 66 rock the pawls 54 into their preparatory position according to the showing of FIG. 5. At the same time the pawls 54' are rocked into their rest position and retained in this position. Now the drive shaft 10 is reversibly rotated for a certain amount by means of a not particularly illustrated auxiliary drive, and the helical teeth 36' and 38' of the clutch star 34' and the drive hub 40' screw out of one another. As soon as this has occurred the drive unit 12 is again placed into operation in its forward direction of movement, and the clutch star 34 entrains by means of the pawls 54 the screw socket or sleeve 46 in the forward rotational direction, so that the screw socket 46 carries out a screw movement at the coarse-pitch threading 50, and thus brings the helical teeth 36 of the clutch star 34 into engagement with the helical teeth 38 of the power take-off hub 40. The left-hand shown jaw clutch 14 of FIG. 1 is thus engaged, whereas the right-hand jaw clutch 14' remains in its rest position where it is ineffectual. Now the drive unit 12 drives the power take-off shaft 16 forwards.

While there are shown and described present preferred embodiments of the invention, it is to be distinctly understood that the invention is not limited thereto, but may be otherwise variously embodied and practiced within the scope of the following claims.

What I claim is:

1. An automatically engageable jaw clutch comprising:
   a toothed drive hub;
   a toothed power take-off hub;
   a clutch star axially displaceable with respect to the power take-off hub;
   a first gear tooth system provided at the clutch star for continuously connecting for conjoint rotation the clutch star with the drive hub;
   a second gear-tooth system provided for said clutch star which can be brought into engagement with the teeth of the power take-off hub by axial displacement of the clutch star;
   a screw socket;
   a pair of coarse-pitch thread means for connecting the screw socket with the power take-off hub;
   said screw socket only being conjointly axially displaceable together with the clutch star and rotatable relative thereto;
   a pawl blocking device composed of pawls and a pawl gear-tooth system;
   said screw socket being entrainable by the clutch star by means of the pawl blocking device when the drive hub overtakes the power take-off hub;
   a switching device for optionally rendering ineffectual the pawls;
   said switching device comprising sleeve means axially shiftable in relation to the clutch star and having a ramp surface which in a predetermined axial position of the sleeve means in relation to the clutch star hinders the pawls from engaging in the pawl gear-tooth system.

2. The jaw clutch as defined in claim 1, wherein:
   the pawl gear-tooth system is arranged radially within the clutch star at the screw socket;
   the pawls being mounted at the clutch star;
   each pawl being provided with a respective counter arm;
   each pawl having a bolt guided to be radially displaceable in the clutch star;
   each said bolt having an end protruding out of the clutch star and coacting with the ramp surface of the sleeve means; and
   each said bolt having a radial inner end which coacts with the counter arm of the related pawl.

3. The jaw clutch as defined in claim 1, wherein:
   the second gear-tooth system of the clutch star and the related gear teeth of the toothed power take-off hub comprise helical teeth;
   said sleeve means having two straight gear-tooth systems;
   the first straight gear-tooth system of the sleeve means continuously meshing with the teeth of the toothed drive hub; and
   the second straight gear-tooth system continuously meshing with said first gear-tooth system of the clutch star.

4. The jaw clutch as defined in claim 1, further including:
   a second jaw clutch symmetrical to and coaxially arranged with respect to the first jaw clutch;
   said second jaw clutch being connected with the first jaw clutch in that the drive hubs of both jaw clutches are connected with a common drive shaft;
   one drive hub of one jaw clutch being fixedly connected with said common drive shaft and the other drive hub being connected with the common drive shaft by means of a reversing gearing;
   both of the power take-off hubs of both jaw clutches being fixedly connected with one another by means of a power take-off shaft;
   both of the power take-off hubs being axially non-displaceably mounted; and
   said switching devices of both jaw clutches being commonly actuatable opposite to one another in relation to their related pawls.

5. An automatically engageable jaw clutch comprising:
   a toothed drive hub;
   a toothed power take-off hub;
   a clutch star axially displaceable with respect to the power take-off hub;
   first teeth means provided at the clutch star for continuously rotatably connecting the clutch star with the drive hub;
   second teeth means provided for said clutch star which can be brought into engagement with the teeth of the toothed power take-off hub by axial displacement of the clutch star;
   socket means;
   a pawl blocking device composed of pawls and coacting ratchet teeth;
   said socket means being entrainable by the clutch star by means of the pawl blocking device;
   a switching device for selectively rendering ineffectual the pawls;
   said switching device comprising sleeve means axially shiftable in relation to the clutch star and having ramp surface means which in a predetermined axial position of the sleeve means in relation to the clutch star hinders the pawls from engaging with the ratchet teeth.

* * * * *